United States Patent Office 3,378,540
Patented Apr. 16, 1968

3,378,540
POLYMERIZATION OF 1-OLEFINS
AND CATALYST
Donald R. Witt, Bartlesville, Okla., assignor to Phillips Petroleum Company, a corporation of Delaware
No Drawing. Filed May 25, 1964, Ser. No. 370,072
1 Claim. (Cl. 260—94.9)

ABSTRACT OF THE DISCLOSURE

Polymers of 1-olefins having controlled melt index are obtained by polymerizing same in the presence of a catalyst system formed by the impregnation of a hydrous oxide gel having a controlled water content with a chromium oxide yielding compound and thereafter activated so as to produce at least 0.1 weight percent hexavalent chromium in the catalyst.

---

This invention relates to an improved chromium oxide olefin polymerization catalyst and process. In one aspect this invention relates to an olefin polymerization process utilizing an improved chromium oxide catalyst.

In a recently developed process disclosed in U.S. Patent 2,825,721, certain olefins and diolefins are polymerized to solid polymers by contacting the olefin feed with a chromium oxide-containing catalyst at relatively low temperatures and pressures in liquid, vapor or mixed phase, preferably in liquid phase in the presence of a solvent-diluent for the olefin. Solid polymers are produced from 1-olefins of 2 to 8 carbon atoms per molecule in which there is no branching nearer the double bond than the 4 position. Diolefins such as styrene and butadiene are also polymerized to solid polymers. The catalyst is effective with other olefins to cause polymerization to solid or liquid polymers. The reaction temperature includes a range of about 150° to 450° F., but temperatures outside this range can also be used to effect the production of solid polymer. The pressure utilized is preferably high enough to maintain the diluent in liquid phase and to assure that olefin not liquefied under these conditions is dissolved in the liquid phase in sufficient amount to effect polymerization. Pressures as low as 100 p.s.i.g. and up to 700 p.s.i.g. or higher are effective, and a pressure of approximately 450 p.s.i.g. is preferred. When effecting the reaction in the vapor phase, the pressure may be as low as atmospheric. Variation in the reaction conditions within in the ranges stated varies the character of the solid polymer produced.

An important property of ethylene polymers is their melt index, which is a measure of extrudability or workability. It is largely a function of the molecular weight of the polymer. There is no optimum melt index since the end use of the polymeric material demands specific properties. For example, pipe-grade polyethylene requires a melt index which is relatively low whereas the polyethylene suitable for bottle fabrication or for decorative uses requires a somewhat higher melt index. Consequently, a polyethylene polymerization process which in capable of producing polymers of varying but controlled melt index is a particularly valubale one. This is especially true if the process displays other attractive characteristics such as high productivity or simplified and economical operation.

Accordingly, it is an object of the present invention to provide an improved process for polymerizing olefins. Another object is to provide an improved olefin polymerization process which effects production of olefins having a high melt index. A further object is to provide a supported chromium oxide catalyst for use in olefin polymerization so as to obtain a polymer having a high melt index. Other objects, aspects and the several advantages of the invention will become apparent from the accompanying disclosure and the claims.

In accordance with my invention I have now found that a high melt index polymer can be obtained by a method in which a wet hydrogel support is impregnated with chromic acid solution and then dried.

A better understanding of my invention can be obtained from the following example in which the impregnating solution was an aqueous solution containing about 0.2 percent chromium trioxide, the final chromium content of the chromiasilica catalyst was about 1.0 percent, and catalyst activation was effected by fluidizing at 1300° F. for 5 hours in air. Preparation of the silica support is described in Table I. The activated catalyst was stored under dry air until used.

Polymerization tests were made in a 1.6-liter (Runs 3 and 4) or a 3-liter (Runs 1 and 2) jacketed reactor equipped with a stirrer. The catalysts were charged to a hot reactor which was being purged with prepurified nitrogen. Normal pentane was then introduced and allowed to flash briefly in order to displace nitrogen. The reactor outlet was then closed, after which the desired amount of pentane was charged and heating was commenced. After the reactor had been brought to within one degree of operating temperature (220° F.), ethylene was introduced. The ethylene flow was adjusted so as to bring the pressure in the reactor to the operating pressure (350 p.s.i.g.) in about 5 minutes. The run was considered to be on stream when an ethylene flow of 15 to 20 grams per hour was observed on the rotometer. Operating pressure was maintained by allowing ethylene to flow on demand from a pressure regulator in the ethylene manifold.

TABLE I.—PREPARATION OF CATALYSTS AND HLMI TESTS

| Run No. | Catalyst Preparation | HLMI [a] |
|---|---|---|
| 1 | Silica hydrogel containing 67 percent water was tray-dried to 2.3 percent water before impregnation. | 5.7 |
| 2 | Same—impregnated before any drying. | 16.9 |
| 3 | Water glass was diluted to about 9 percent silica with water, a 21 percent (by volume) solution of sulfuric acid was added with stirring to a pH of 9-10, the gel was aged overnight, washed twice with deionized water, treated with 2.5 percent (by weight) solution of ammonium nitrate for sodium removal, and washed twice with deionized water. The finished gel was spray-dried at 1,000° F. before impregnation. | 7.5 |
| 4 | Same as in Run 3 except impregnated before spray drying.[b] | 13.4 |

[a] ASTM D1238-57T, Condition F.
[b] A 10 percent solution of ammonium sulfate was used instead of sulfuric acid and the final pH was 10.6 instead of 9-10.

The tabulated data all show an increase in polymer high-load melt index (HLMI) with increase in water content of the silica support prior to impregnation. Highest melt indexes are obtained with catalysts in which the silica was not dried at all prior to impregnation.

According to Colloidal Phenomena by Hauser (McGraw-Hill, 1939), a gel is a solid, rigid and coherent system composed of dispersion medium and disperse part, the latter having particles of colloidal dimensions. Gels are systems that will exhibit flow only upon the influence of a finite force necessary to overcome the forces holding the particles in place—i.e., the system has a measurable yield point. When the dispersion medium is water, the gel is known as a hydrogel.

The disperse part of the hydrogel supports used in preparing the catalyst of my invention consists of one or more oxides selected from the group silica, alumina, zirconia and thoria, and is preferably silica. The water content of the hydrogel is variable, depending on the method of preparation used, but is generally in the range of 25 to 95 weight percent.

Suitable chromium compounds for impregnating the hydrogel support include chromium nitrate, chromium chloride, and chromic acid (aqueous solution of $CrO_3$). Impregnation with chromic acid or with chromium nitrate is preferred in view of the fact that these solutions are easier to work with and generally produce more active catalysts than other types of solutions. The amount and concentration of the chromium solution is controlled so as to incorporate an amount of chromium in the catalyst composite in the range of 0.1 to 10 or more weight percent. Concentrations higher than 10 percent are operable and can be used. It is essential that a substantial portion of the chromium in the catalyst be in the hexavalent state. Hexavalent chromium in the catalyst should be at least 0.1 weight percent of the composite and larger proportions are more desirable. It is preferred that not more than 25 weight percent of the chromium in the catalyst is trivalent.

Reasonable variations and modifications of this invention can be made or followed, in view of the foregoing discosure and discussion, without departing from the spirit and scope thereof.

I claim:

1. A process for the polymerization of 1-olefins having from 2 to 8 carbon atoms therein so as to obtain polymers having an increased high-load melt index value and a controlled melt index which comprises polymerizing at least one of said 1-olefins in a polymerization zone under polymerization conditions in the presence of a polymerization catalyst formed by (a) forming a hydrogel support consisting of at least one hydrous oxide gel selected from the group consisting of silica, alumina, zirconia, and thoria and having a water content in the range of 25 to 95 weight percent;

(b) impregnating the resulting hydrous oxide gel with an aqueous solution of a chromium oxide yielding compound so as to incorporate an amount of chromium in the catalyst composite in the range of 0.1 to 10 weight percent;

(c) drying the resulting impregnated composition consisting of said hydrous oxide gel and chromium oxide yielding compound;

(d) activating the resulting impregnated hydrous oxide gel by heating same in air to produce at least 0.1 weight percent hexavalent chromium in the catalyst;

and thereafter recovering the resulting polymer as a product of the process wherein the melt index of said polymer is controlled responsive to the amount of water present in the hydrous oxide gel composition prior to impregnation with said chromium oxide yielding compound.

References Cited

UNITED STATES PATENTS

| | | | |
|---|---|---|---|
| 3,004,016 | 10/1961 | Hawkins | 260—94.9 |
| 3,182,048 | 5/1965 | Mills | 260—94.9 |
| 2,849,383 | 8/1958 | Hirschler et al. | 252—458 X |
| 2,891,935 | 6/1959 | Lanning | 252—458 X |
| 2,898,305 | 8/1959 | Teter at al. | 252—455 |
| 3,167,497 | 1/1965 | Solomon | 252—458 X |
| 3,201,476 | 8/1965 | Baker et al. | 252—458 X |

DANIEL E. WYMAN, *Primary Examiner.*

OSCAR R. VERTIZ, *Examiner.*

C. F. DEES, A. GREIF, *Assistant Examiners.*